United States Patent [19]

Takamura et al.

[11] 4,037,033
[45] July 19, 1977

[54] RECHARGEABLE NICKEL-ZINC BATTERY

[75] Inventors: Tsutomu Takamura, Kawasaki; Tamotsu Shirogami, Yamato; Hirokazu Niki, Yokohama; Kazuo Aizawa, Kawasaki, all of Japan

[73] Assignee: Tokyo Shibaura Electric Co. Ltd., Kawasaki, Japan

[21] Appl. No.: 650,782

[22] Filed: Jan. 20, 1976

[30] Foreign Application Priority Data

Jan. 20, 1975 Japan .................. 50-8440

[51] Int. Cl.² ............................ H01M 6/04
[52] U.S. Cl. ................... 429/206; 429/223; 429/229
[58] Field of Search ............. 136/30, 28, 125, 130; 429/206, 223, 229–231, 246, 251, 252

[56] References Cited

U.S. PATENT DOCUMENTS

| 3,174,879 | 3/1965 | Stanimirovitch | 136/28 X |
| 3,497,387 | 2/1970 | Amiet | 136/30 |
| 3,516,862 | 6/1970 | Van Der Grinten | 136/30 |
| 3,669,746 | 6/1972 | Devitt et al. | 136/30 |
| 3,736,185 | 5/1973 | Smatko | 136/30 |
| 3,847,668 | 11/1974 | Kramer et al. | 136/30 X |
| 3,873,367 | 3/1975 | Kandler | 136/30 |
| 3,951,687 | 4/1976 | Takamura et al. | 136/30 X |

Primary Examiner—C. F. LeFevour
Attorney, Agent, or Firm—Oblon, Fisher, Spivak, McClelland & Maier

[57] ABSTRACT

An improved rechargeable nickel-zinc battery is described which is capable of undergoing many charge-discharge cycles (cycle life), with deep discharge, and of high performance with heavy drain discharge during use. The increased cycle life is accomplished by a suitable combination of electrochemical generating elements. The high performance with heavy drain discharge service is obtained by an improved zinc electrode construction. The battery of this invention has a sheet-like kneaded zinc electrode, a sheet-like nickel oxide electrode with limited capacity ratio thereof, a separator, an electrolyte absorber, and a concentrated alkaline electrolyte in limited amounts.

11 Claims, 2 Drawing Figures

RECHARGEABLE NICKEL-ZINC BATTERY

BACKGROUND OF THE INVENTION

1. Field of the Invention

This invention relates to a rechargeable nickel-zinc battery wherein a combination of electrochemical elements is composed of a sheet-like negative electrode containing zinc compound as the active material, a sheet-like positive electrode containing nickel oxide compound as an active material, a separator, an electrolyte absorber and an alkaline electrolyte.

2. Description of the Prior Art

Recently, many experiments have been carried out in an attempt to develop rechargeable batteries having alkaline electrolyte and zinc compound used as a negative electrode material, because such a combination would have many excellent characteristics such as high energy density, high working voltage, reasonable material cost, excellent heavy drain duty performance and low temperature duty characteristics. After many technological efforts improvements to obtain a long life for charge-discharge cyclic operations have been found. An electrode, for an example, was made by coating a mixture of zinc oxide and/or zinc powder and mercury or mercuric oxide on a current collector wherein the zinc oxide and/or zinc powder comprised from 80 to 90 wt % of the mixture and the mercury or mercuric oxide comprised 5 to 20 wt %. However, the discharge capacity of the battery having this electrode gradually decreases if the battery is subjected to a repetitive charge-discharge operation even under the low current density of 2 to 3 $mA/cm^2$. In such an operation it was difficult to go over 50 cycles as the capacity decreased to half the initial capacity. The rechargeable batteries in commercial use muse keep more than half of the initial capacity even after the 200th charging treatment. To produce such batteries, new improvements in the zinc electrode, the positive electrode, the separator, the electrolyte absorber and the electrolyte are necessary.

A good rechargeability for a battery can be expected, if the discharged product of the zinc electrode of the battery does not dissolve into the electrolyte during discharge. One electrode tested for preventing the dissolution was a sheet-like zinc electrode containing calcium hydroxide for fixing the discharge products as $CaZn(OH)_4$ on the electrode as reported by N. A. Zhulidov in U.S.S.R. Author's Certificate No. 116812 filed on Mar. 7, 1958. However, this electrode cannot endure high drain discharge service because of the formation of passive film on the zinc powder which is called passivation phenomena. Also, a semi-dry-type negative electrode in which the amount of the electrolyte was restricted in order to prevent the dissolution of the reactive products into the electrolyte was tested but it, too, proved unsatisfactory. Accordingly, there is a need for a battery capable of undergoing many charge-discharge cycles at a high drain rate of discharge.

SUMMARY OF THE INVENTION

It is therefore an object of this invention to provide a long cycle life rechargeable nickel-zinc battery.

It is further object of this invention to provide a rechargeable nickel-zinc battery which is useable for heavy drain discharge service.

It is still further an object of this invention to provide a rechargeable nickel-zinc battery which is suitable as a replacement for the conventional dry-cell.

These objects are accomplished by a suitable combination of a negative electrode, a positive electrode with limited capacity ratio thereof, a separator, an electrolyte absorber and a limited amount of alkaline electrolyte. The negative electrode is prepared by fixing the sheet of negative electrode mixture to a current collector. Said sheet of negative electrode mixture is made by kneading a mixture of 2 to 13 wt % of a fluoride resin which is dispersed in an alkaline solution, 3 to 20 wt % of calcium oxide and/or calcium hydroxide, 1 to 20 wt % of metallic compound which comprises at least one material selected from the group consisting of bismuth oxide, bismuth hydroxide, cadmium oxide and cadmium hydroxide, 2 to 10 wt % of zinc powder and the balance being zinc oxide and/or zinc hydroxide, and laminating several layers of such sheet.

The positive electrode is provided with a sintered-type or a plastic bonded type hydrated nickel oxide electrode and has a theoretical capacity limited to one-quarter to one-half that of said negative electrode.

The separator is desirably produced by coating a paste of polyvinyl alcohol and a boric compound on non-woven fabric which is durable in the concentrated alkaline solution and difficult to oxidize.

The electrolyte absorber is provided with a thin non-woven cloth which is also durable in the alkaline solution, it is soaked with a solution of a surfactant and dried before use so as to be easily wet by the alkaline electrolyte during the process of manufacturing the cells. If the separator or both electrodes absorb the alkaline electrolyte the absorber is not necessary.

The amount of the concentrated alkaline electrolyte is preferably within the range of 1.0 to 1.7 ml per 1 Ah of the theoretical capacity of said negative electrode.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENT

Figure 1:
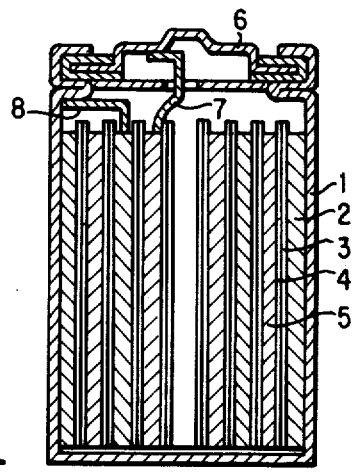
FIG. 1 shows the electrode construction of the rechargeable nickel-zinc battery of this invention.

In FIG. 1 of the drawing, there is shown a whirlpool shape-type of rechargeable nickel-zinc battery which comprises a casing 1. An example of the battery construction is, a columner electrochemical generating body formed by overlapping a zinc electrode sheet 2 as a negative electrode, a separator 3, an electrolyte absober 4 as an electrolyte absorbent material and a nickel electrode sheet 5 as a positive electrode are positioned within the casing 1 which has a metal-made top cap 6, and it serves as positive electrode terminal which is electrically connected to the positive electrode 5 by use a suitable electrical lead 7. Through a lead 8, the negative electrode 2 is connected electrically to the inner portion of the casing. An alkaline electrolyte, such as potassium hydroxide, is impregnated in the separator 3 and the electrolyte absober 4.

Figure 2:
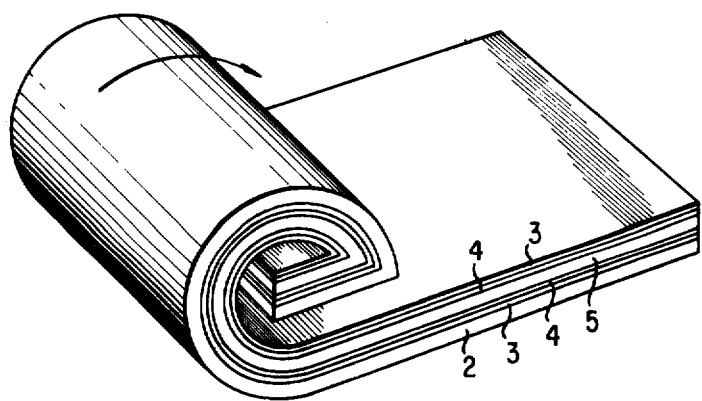
FIG. 2 is a sectional view illustrating the condition in which the electrodes of FIG. 1 are housed within a cylindrical casing.

The columner electrochemical generating body, as shown in FIG. 2, is obtained by winding from one end of the superposed layer of a zinc electrode 2, a separator 3, an electrolyte absorber 4 and a positive electrode 5. After the winding, said resultant body is fastened by an adhesive tape.

The zinc electrode 2 utilized in the nickel-zinc rechargeable battery of this invention is obtained by fixing the sheet of negative electrode mixtures to a current collector. An expanded sheet, a wire net or a punched sheet, a screen sheet of silver, silver plated copper or brass etc. may be used as the current collector. The sheet of negative electrode mixture contains 2 to 13 wt % of a fluoride resin such as polytetrafluoroethylene (PTFE), fluoroethylene propylene (FEP), fluoro vinylidene or fluoro hexa propylene, dispersed in an alkaline solution, 60 to 94 wt % of the active materials as the main ingredients and the rest of the additive materials. Said active materials are the powder of at least one member of the group of zinc oxide and zinc hydroxide, and zinc powder. Said additive materials are the mixed powder of 3 to 20 wt % of at least one member selected from the group of calcium oxide and calcium hydroxide, and 1 to 20 wt % of at least one member selected from the group of bismuth oxide, bismuth hydroxide, cadmium oxide and cadmium hydroxide.

The zinc electrode 2 is manufactured, for example as follows, first, add a dispersed alkaline solution of the fluoride resin to the mixture of zinc oxide powder, zinc powder, bismuth oxide powder and calcium hydroxide powder. The resultant mixture is well-kneaded to make a flexible soft sheet which is then rolled to a thickness of 0.2 to 0.7 mm. In order to attain easy handling, the negative electrode sheet should preferably be prepared as follows: several sheets which are elongated in different directions are piled up and laminated by rolling, so that many fibrous PTFE filaments become entangled with each other and hold the powder mixture tightly together.

When the alkaline electrolyte is soaked into the electrode, a metallic sponge skelton of bismuth or cadmium is formed over the negative electrode, then the active material, electrolyte, and calcium hydroxide are fixed in the pore of the metallic skelton and the electrode becomes useable for a heavy drain service. As the skelton of this electrode prepared by these processes, is tightly held together, the high performance of the electrode is maintained through many discharge-charge cycles.

A separator 3 is used in order to prevent short circuit formation between the dendritically grown zinc and the positive electrode. It is produced by coating a mixture of polyvinyl alcohol and an aqueous boric compound such as boric acid or ortho boric acid onto a non-woven fabric consisting of at least one member selected from the group of a fabric made of a natural fiber, and synthetic resin, such as nylon, polyamide, polyethylene, polypropyrene, polystyrene, polyvinyl formal, polyvinyl chloride, polyvinyl alcohol, polyvinyl chloride acrylonitrile copolymer or polyvinyl chloride acrylic ester, which are durable in a concentrated alkaline solution. In place of the boric compound magnesium oxide, calcium oxide, titanium oxide, zirconium oxide, aluminum oxide, $\beta$-alumina or mixture thereof may be used. Preferably, the fabric has a thickness of about 0.05 to 0.15 mm. Before the coating procedure the non-woven fabric is pretreated by soaking in a solution of a surfactant such as alkylaryl polyether alcohol, alkylarylether sulfonate or poloxyethylene tridecyl alcohol, and then dried. Since all the pores of the porous body are filled with the alkaline solution of polyvinyl alcohol during the coating, the separator does not have any large pinholes which permit the penetration of the dendrite growth of zinc during the charging process of the battery but does have excellent ionic conductivity and is durable in concentrated alkaline solution. The pretreatment ensures the separator function of preventing short circuits, and renders mass production.

An electrolyte absorber 4 is adapted for retaining the alkaline electrolyte. It is prepared by filling the mixture of non-ionic surfactant as mentioned in the separator, polyvinyl alcohol and powder of an alkali resisting oxidized material such as titanium oxide, magnesium oxide or barium oxide, into the non-woven fabric which is the same type of material as used in the separator described above. However, the use of an electrolyte absorber is optional.

Next the postive electrode 5, typically a sheet-like one is used, is prepared by heat pressing the mixture of hydrated nickel oxide powder, a plastic binder and a conductive material. Preferably a sheet-like electrode having a thickness of 0.5 to 2 mm is obtained. Alternatively a sintered-type nickel oxide positive electrode can be used. It is prepared by impregnating a nickel hydroxide sintered plate. The theoretical capacity of the positive electrode is preferable one-quarter to one-half that of the theoretical capacity of the negative electrode. Said theoretical capacity is defined as the value which is calculated from the amount of active material in the mixture. For the electrolyte of the rechargeable nickel-zinc battery of this invention, solutions of either hydroxide or potassium hydroxide are useable, preferably, the concentration of such a solution is from 2 to 10 molar. Also, the amount of solution is from 1 to 1.7 ml per 1 Ah of the theoretical capacity of zinc negative electrode. The reason for limiting the amount of electrolyte is to prevent the dissolution of discharge product of zinc into the electrolyte.

In this matter, the rechargeable nickel-zinc battery of this invention based on the combination of the zinc electrode, the separator, the electrolyte absober which is optional, the nickel electrode of limited capacity and the electrolyte of limited amount of respectively, having excellent performance characteristics and prolonged cycle life is obtained.

The C-size battery which may be prepared by the processes described above, has a discharge capacity in the range of 1.2 to 1.5 Ah initially and may be kept for 300 cycle under the conditions of 0.5 C charge and 0.17 C discharge before its capacity is reduced to one-half the initial capacity.

The amount of the calcium oxide or calcium hydroxide contained the mixture of the negative electrode must be limited to less than 20 wt %, otherwise, the electrode capacity decreases rapidly along with passivation of the zinc, if the amount is less than 1 wt %, the electrode cannot keep the necessary conductivity for the entire cycle life.

The amount of polytetrafluoroethylene (PTFE) contained in the mixture of the negative electrode is also important, if the electrode contains more than 4 wt % PTFE, the negative electrode shows excellent mechanical properties and may be formed into thin sheets. If it exceeds more than 14 wt %, the electrode performance decreases rapidly.

Also, the amount of the electrolyte has a serious effect on the cycle life as describe above. When the battery contains an excessive amount of electrolyte, it can not maintain a long cycle life, but the lack of electrolyte lowers the performance of the battery. A suitable amount of the electrolyte, found experimentally, is from 1.0 to 1.7 ml per 1 Ah of the theoretical zinc electrode capacity.

Having generally described the invention, a more complete understanding can be obtained by reference to certain specific examples, which are included for purposes of illustration only and are not intended to be limiting unless otherwise specified.

EXAMPLE

The negative electrode which includes the various components as the active materials tabulated in Table 1, were produced. The sheet-like plate had a thickness of 0.8 to 1 mm and was pressed into the current collector of expanded silver plated copper to adhere the mixture sheet of the active materials thereon.

For the comparison, the conventional type zinc electrodes which contains mercury oxide in the negative electrode mixture, were tested, indicated as type-C. All test batteries were made in C-size shape having 1.2 Ah nominal capacity. The results are shown in Table 2, along with the combination of the electrodes, the amount of electrolyte and the cycle life of the batteries. All the batteries were prepared with use a separator of non-woven fabric of a copolymer of acrylonitrile and polyvinyl chloride which were coated with the mixture of polyvinyl alcohol (PVA) and boric acid aqueous solution after pretreatment with a wetting agent. A mixture of PVA and $TiO_2$ powder was soaked into a non-woven fabric material after treatment with a non-ionic sufactant to prepare the electrolyte absorber. The battery tests of cyclic life were accomplished under the conditions of 0.5 C charge for 2.5 Hr and 0.1 C discharge fully to the end voltage of 0.9 V every time. The tabulated number represents the number of charge-discharge cycles the battery has undergone when the capacity goes down to the half value of the nominal capacity.

As is apparent in Table 2, the batteries which had the longer cycle life and thus, have the most utilities, have a negative electrode made of the mixture of calcium hydroxide of 10 wt %, bismuth oxide 10 wt %, zinc oxide 67 wt %, zinc powder 5 wt % and PTFE 8 wt %, an amount of electrolyte of which is from 1 to 1.5 ml per 1 Ah of the negative electrode capacity, and a positive electrode which has a capacity of from ¼ to ½ the theoretical capacity of the negative electrode.

Table 1

| Contents | type of the zinc negative electrode (weight per cent) | | | | | | |
|---|---|---|---|---|---|---|---|
| | $A_1$ | $A_2$ | $A_3$ | $B_1$ | $B_2$ | $B_3$ | C |
| $Ca(OH)_2$ | 0 | 10 | 20 | 5 | 15 | 25 | 10 |
| $Bi_2O_3$ | 10 | 10 | 10 | 0 | 0 | 0 | 0 |
| Cd O | 0 | 0 | 0 | 10 | 10 | 10 | 0 |
| Zn O | 77 | 67 | 57 | 65 | 62 | 52 | 77 |
| Zn | 5 | 5 | 5 | 5 | 5 | 5 | 0 |
| Hg O | 0 | 0 | 0 | 0 | 0 | 0 | 5 |
| Fluorine containing resin | 8 | 8 | 8 | 15 | 8 | 8 | 8 |

Table 2

| Number of tested battery | The type of zinc electrode | The capacity of zinc electrode | The liquid quantity of electrolyte | The capacity of nickel electrode | Cyclic life |
|---|---|---|---|---|---|
| 1 | $A_1$ | 4 Ah | 6 ml | 1.5 Ah | 90 |
| 2 | $A_1$ | 4 Ah | 6 ml | 1.5 Ah | 90 |
| 3 | $A_1$ | 5 Ah | 5 ml | 1.5 Ah | 100 |
| 4 | $A_1$ | 3 Ah | 4 ml | 1.5 Ah | 60 |
| 5 | $A_1$ | 2 Ah | 3 ml | 1.5 Ah | 50 |
| 6 | $A_2$ | 4 Ah | 6 ml | 1.5 Ah | 320 |
| 7 | $A_2$ | 5 Ah | 5 ml | 1.5 Ah | 350 |
| 8 | $A_2$ | 4 Ah | 4 ml | 1.5 Ah | 280 |
| 9 | $A_2$ | 6 Ah | 6 ml | 1.5 Ah | 220 |
| 10 | $A_2$ | 3 Ah | 5 ml | 1.5 Ah | 120 |
| 11 | $A_2$ | 3 Ah | 6 ml | 1.5 Ah | 60 |
| 12 | $A_3$ | 4 Ah | 6 ml | 1.5 Ah | 180 |
| 13 | $A_3$ | 4 Ah | 4 ml | 1.5 Ah | 105 |
| 14 | $B_1$ | 3 Ah | 5 ml | 1.5 Ah | 20 |
| 15 | $B_2$ | 4 Ah | 6 ml | 1.5 Ah | 280 |
| 16 | $B_2$ | 4 Ah | 5 ml | 1.5 Ah | 320 |
| 17 | $B_2$ | 4 Ah | 4 ml | 1.5 Ah | 270 |
| 18 | $B_2$ | 3 Ah | 4 ml | 1.5 Ah | 210 |
| 19 | $B_3$ | 3 Ah | 5 ml | 1.5 Ah | 120 |
| 20 | C | 4 Ah | 5 ml | 1.5 Ah | 38 |

The alkaline resisting porous body of electrolyte absober may be a non-woven fabric or woven fabric porous body of polyvinyl formal, polystyrene, polypropylene, and the copolymer of a acrylonitril and polyvinyl chloride.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A rechargeable nickel-zinc battery comprising in combination:
   a. a negative electrode prepared by adhering to a current collector sheet, a mixture comprising a fluorine containing resin and a powder which contains 3 to 20 wt. % of at least one member selected from the group consisting of calcium oxide and calcium hydroxide, 1 to 20 wt. % of at least one member selected from the group consisting of bismuth oxide, bismuth hydroxide, cadmium oxide and cadmium hydroxide; the balance being zinc and at least one member selected from the group consisting of zinc oxide and zinc hydroxide, with said sheet structure of fluorine containing resin;
   b. a positive electrode having hydrated nickel oxide as the active material and having a theoretical capacity of one-quarter to one half times the theoretical capacity of said negative electrode;
   c. a separator which is place between said negative and positive electrodes;
   d. a quantity of concentrated alkaline electrolyte of from 1.0 to 1.7 ml per one ampere hour of the theoretical capacity of said negative electrode.

2. The rechargeable nickel-zinc battery of claim 1 wherein said concentrated alkaline electrolyte is a solution of sodium hydroxide or potassium hydroxide and has a concentration of from 2 to 10 molar.

3. The rechargeable nickel-zinc battery of claim 1 wherein said negative electrode is a laminate at least two of said sheets and where said sheets have been elongated in different directions to cause entanglement of the fluorine containing resin.

4. The rechargeable nickel-zinc battery of claim 1 wherein the current collector of said sheet-like negative electrode is one selected from the group consisting of the metal net of silver, silver-plated copper or brass, formed in the shape of an expanded sheet, a wire net, and a punched screen sheet.

5. The rechargeable nickel-zinc battery of claim 1 wherein said mixture sheet of said zinc electrode is a sintered material.

6. The rechargeable nickel-zinc battery of claim 1 wherein said sheet-like zinc electrode and nickel electrode are wound into a whirlpool with said separator interposed therebetween.

7. A rechargeable nickel-zinc battery comprising in combination:
  a. a negative electrode prepared by adhering to a current collector sheet, a mixture comprising a fluorine containing resin and a powder which contains 3 to 20 wt. % of at least one member selected from the group consisting of calcium oxide and calcium hydroxide, 1 to 20 wt. % of at least one member selected from the group consisting of bismuth oxide, bismuth hydroxide, cadmium oxide and cadmium hydroxide; the balance being zinc and at least one member selected from the group consisting of zinc oxide and zinc hydroxide, with said sheet structure of fluorine containing resin;
  b. a positive electrode having hydrated nickel oxide as the active material and having a theoretical capacity of one-quarter to one-half times the theoretical capacity of said negative electrode;
  c. a separator having a sheet-like non-woven fabric coated with polyvinyl alcohol and at least one member selected from the group consisting of boric compounds, magnesium oxide, calcium oxide, titanium oxide, zirconium oxide, aluminum oxide and β-alumina;
  d. an electrolye absorber having a sheet-like alkaline resisting porous body impregnated with a mixture of polyvinyl alcohol and an alkaline resisting oxidized material, and
  e. a quantity of concentrated alkaline electrolyte of from 1.0 to 1.7 ml per one ampere hour of the theoretical capacity of said negaive electrode.

8. The rechargeable nickel-zinc battery of claim 7 wherein said alkaline resisting porous body of said absober is a non-woven fabric made of synthetic fibers.

9. The rechargeable nickel-zinc battery of claim 7 wherein the alkaline resisting oxidized material of said absorber is at least one member selected from the group consisting of titanium oxide, magnesium oxide and barium oxide.

10. The rechargeable nickel-zinc battery of claim 7 wherein said separator is coated with polyvinyl alcohol and one member selected from the group consisting of magnesium oxide, calcium oxide, titanium oxide, zirconium oxide, aluminum oxide, β-alumina, and the mixtures thereof.

11. The rechargeable nickel-zinc battery of claim 7 wherein said non-woven fabric is made of a synthetic resin selected from the group consisting on nylon, polyethylene, polypropyrene, polystyrene, polyvinyl chloride, polyvinyl alcohol and acrylonitrile vinyl chloride copolymer, polyvinyl chloride acrylic ester and the mixtures thereof.

* * * * *